Figure 2:
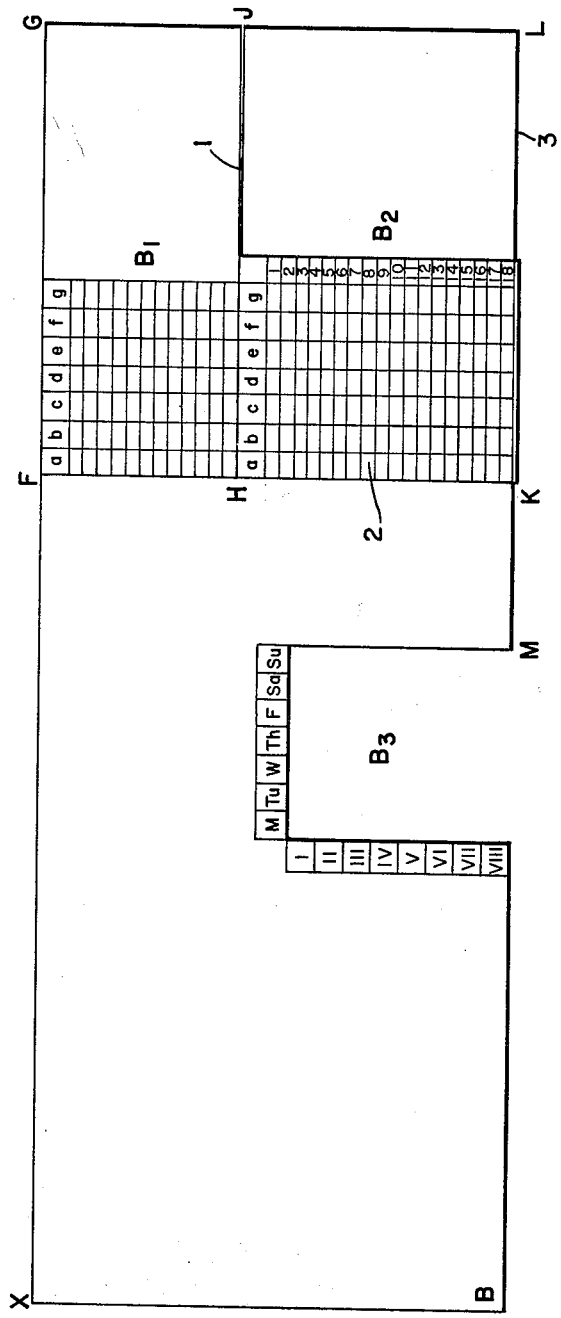

Jan. 26, 1965  E. F. JAICKLES  3,166,862
PERPETUAL MOVABLE CALENDAR
Filed Nov. 30, 1961  4 Sheets-Sheet 1

FIG. 1

Jan. 26, 1965  E. F. JAICKLES  3,166,862
PERPETUAL MOVABLE CALENDAR
Filed Nov. 30, 1961  4 Sheets-Sheet 2

INVENTOR
ENRIQUE FASSLER JAICKLES
BY Lamont Johnston
ATTORNEY

Jan. 26, 1965  E. F. JAICKLES  3,166,862
PERPETUAL MOVABLE CALENDAR

Filed Nov. 30, 1961  4 Sheets-Sheet 3

INVENTOR
ENRIQUE FASSLER JAICKLES
BY Lamont Johnston
ATTORNEY

Jan. 26, 1965

E. F. JAICKLES 3,166,862

PERPETUAL MOVABLE CALENDAR

Filed Nov. 30, 1961

4 Sheets-Sheet 4

FIG. 4

INVENTOR
ENRIQUE FASSLER JAICKLES
BY
ATTORNEY

United States Patent Office 3,166,862
Patented Jan. 26, 1965

3,166,862
PERPETUAL MOVABLE CALENDAR
Enrique Fassler Jaickles, Santo Domingo 2582,
Santiago, Chile
Filed Nov. 30, 1961, Ser. No. 156,022
1 Claim. (Cl. 40—109)

The present invention refers to perpetual calendars. The term "perpetual calendar," as herein used, is meant to be understood as referring to a calendar that permits the user to find therewith the days of any month he pleases, based on a given reckoning, as, e.g., our present calendar, the Gregorian Calendar.

Such calendars are known and quite a few attempts have been made to produce certain limited calendars which, at most, give results for a few centuries. The invention, however, shows a simple system for producing a reliable calendar that will work well for all centuries, past and future, as will be seen in the description that follows.

The calendar is composed of several sheets of material, preference being had for the use of millboard, cardboard and certain plastic sheets that are opaque, take printing well with ease and permanency and are relatively stiff. Metal sheets are also useful.

The following description will be understod with relation to the accompanying drawings, and the figures on said drawings are better set forth and explained in the order of their appearance, as follows:

FIGURE 1 depicts the basic field of the calendar of the invention and is to be considered as the fixed field in relation to which the other parts of the calendar, as will be duly explained, are shifted about during use.

Fixed field A has depicted on its surface, in the approximate position drawn in the figure, a first table $A_1$, which essentially consisted of 25 columns, headed for reference purposes by the letters $a, b, c, d, e, f, g, h, i, j, k, l, m, n, o, p, q, r, s, t, u, v, w, x, y$. Each column contains eight lines or rows which are numbered, on the left margin of the table, successively with the digits 1, 2, 3, 4, 5, 6, 7 and 8. It is essential that the lines defining these rows and columns form a plurality of spaces which are all of the same size. The length of the bottom side chosen as unit for these rectangles, will be known as the "basic unit" due to its importance in its use in the calendar: likewise, the vertical sides of the chosen rectangle will be the basic height unit. Both units may, of course, be chosen arbitrarily. In the example shown in the drawings, the rectangles are squares.

The rows are filled with digits as shown particularly in FIG. 1; thus, row 1 starts with 1 at the $w$ column and ends with 3 in the $y$ column; row 2 starts with 1 in the $p$ column and ends with 10 in the $y$ column; row 3 starts with 1 at the $i$ column and ends with 17 at the $y$ column, and so on; the rest of the rows start with the numerals in such a way that, between rows, there is a positive difference of 7 to each lower row. However, no row has numbers below 1, nor above 31, i.e., the greatest number of days in any calendar month.

Below row 8 comes a wider row divided into columns to the same basic unit; starting at the left, the first four columns $a–d$ have the designations FEB., Lp-Year, 4–6–9–11 and 1–3–5–7–8–10–12, respectively; they correspond, respectively, to the months that have 28, 29, 30 and 31 days. After three blank columns, these indications are repeated until the final column, $y$, is reached with the indication 1–3–5–7–8–10–12, i.e., the numbers of the months that have 31 days. Here the English language has been used for the designations, but evidently the designations may be translated into any other chosen language.

Table $A_1$ is amplified by Table $A_2$, joined to $A_1$ in the relative positions shown in FIG. 1. This consists essentially of 8 columns, each with the width of the basic unit in Table $A_1$, followed by a wider column containing, in abbreviation or in full, the names of the months in the chosen language. This table has a total of 13 lines or rows. In the 8th column of Table $A_2$ we place the Roman numerals I–XII of the numbers of the months, while columns $a–g$ contain the arabic numerals of the months, spaced as shown particularly in Table $A_2$ of FIG. 1. The 13th row contains the letters $a, b, c, d, e, f, g$, for reference purposes, and we thus complete basic field A of the calendar.

Care should be taken that space $y–8$ of Table $A_1$ diagonally adjoins space I–$a$ of Table $A_2$, as shown, and that the rows and columns throughout FIG. 1 are all respectively and substantially parallel to each other, the intersections being, of course, at right angles.

FIG. 2 shows the movable field B on which are drawn, printed or otherwise depicted, a first fixed Table $B_1$ divided into 7 columns headed by the letters $a, b, c, d, e, f, g$. The vertical length GL of field B is equal to width DE in FIG. 1; columns $a–g$ of Table $B_1$ coincide with columns $a–g$ of Table $A_2$ of FIG. 1.

Figure 3:
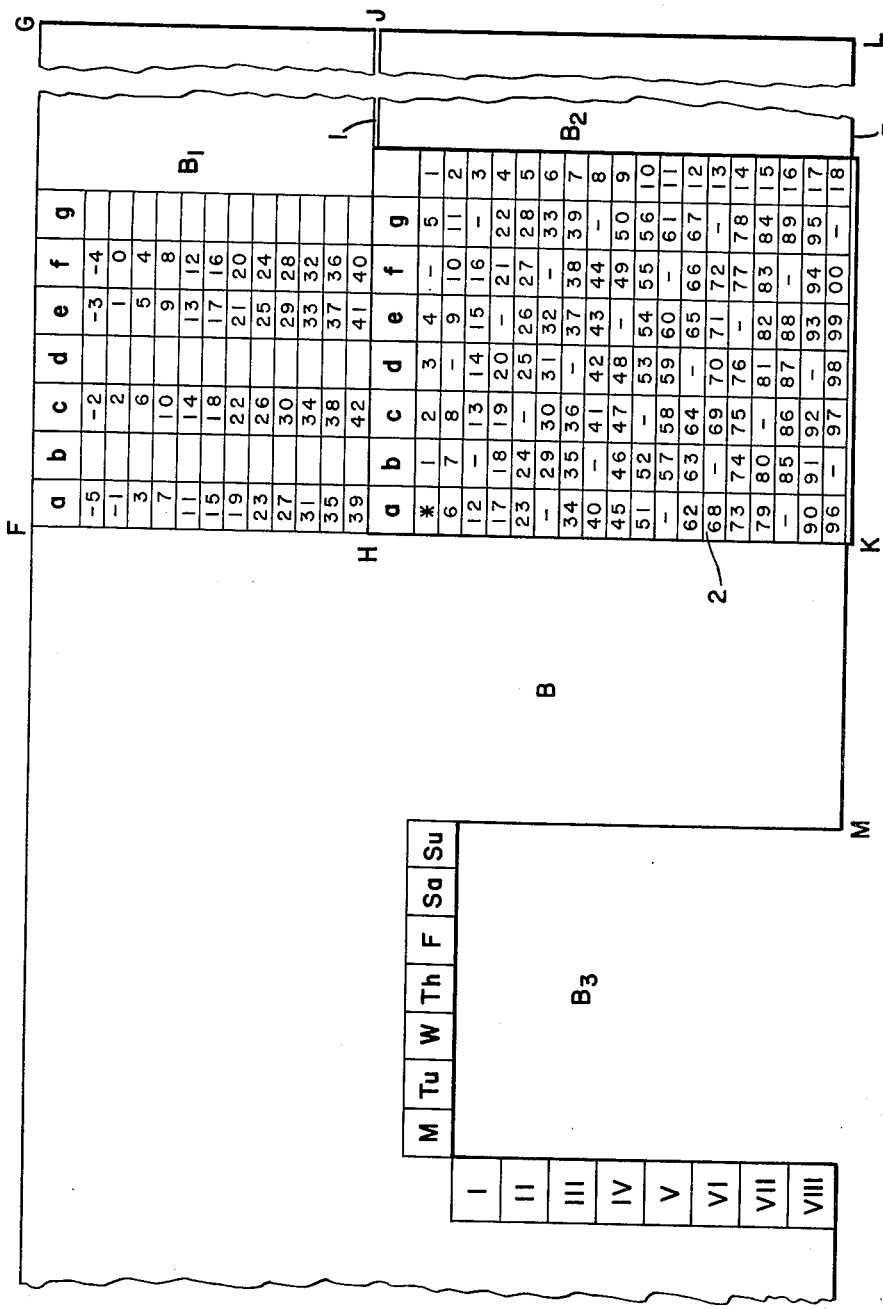

The lines or rows of fixed Table $B_1$ total 12 and are usually drawn to a spacing of ½ the basic height unit of Table $A_1$, but neither this, nor their number, is critical. No numeration has been placed in this table in FIG. 2, for clarity of illustration; the correct manner of numbering the spaces is shown in FIG. 3, which is a reproduction of part of FIG. 2 to a larger scale. The numeration of these spaces, shown in FIG. 3, is peculiar to the calendar. These numbers are the first or the first two digits of the years; thus, e.g., 7 is the position corresponding to all years from 700–799 inclusive. Numbers preceded by a minus sign refer to years B.C. Although the Gregorian Calendar came into use in 1582 in the month of October, the calendar of the invention in the embodiment shown permits finding the calendar month for any year previous to said date, as if the Gregorian Calendar had been in use then, and then it would be easy to use known conversion tables to find the proper dates in any other calendar that may be desired.

Now, field B is cut by or provided with a very narrow slot 1 along the line HJ parallel, of course, to edge FG and edge KL. Now prepare field $B_2$ in the shape of a slide; for instance, $B_2$ could be depicted on a rather longer (in the vertical direction) strip 2 of suitable material, and the blank edges would be turned in to meet, overlapping the slot 1 and edge 3, where they would be joined together in some suitable fashion, thus providing a sleeve 2 that will act properly as a slide. Other types of slides may, of course, be used. Slide $B_2$ is divided into 8 columns, of which the first 7 correspond to the 7 columns of $B_1$ and are designated $a, b, c, d, e, f, g$. Vertically, the rows are made with a spacing of, usually ½ the basic height unit and they are numbered consecutively from 1–18 (see FIG. 3). The numbering of these spaces, similarly to what has been explained, is also shown in detail in FIG. 3, as it is a special distribution arising from the invention. Not all the spaces are numbered: some are designated by a dash; these have to do with leap years, as will be explained when dealing with the use of the calendar.

The movable field B is completed by cutting out the portion $B_3$, which has a clear width of 7 basic units and a clear height of 8 height basic units, as used in FIG. 1. The upper edge of $B_3$ is designated with the first letters of the week-days, starting with Monday; FIGS. 2 and 3 indicate this designation for the English language but, of course, its translation into any chosen language is within the scope of the invention. The left edge (or the right edge, if desired) is designated with the Roman numerals I–VIII, respectively. Both the letters for the days and the Roman numerals are interspaced on the respective basic unit. It is important, however, that the distance MK depicted in FIGS. 2 and 3 shall correspond to 6 basic units, in order that movable field B, with its slide $B_2$, can cooperate properly with the fixed field A of FIG. 1. In use, movable field B is placed over field A in such a manner that their upper edges GX and EY coincide; but, of course, not necessarily will X coincide with Y, as we soon shall see why.

It will be noticed then, when the fields are placed one on the other, as stated above, and in some intermediate position lengthways, provided the spacings M–Tu–W etc. of $B_3$ coincide with some of the columns of $A_1$, that in the cut-out space $B_3$ we shall see a total calendar month of 31 days, appearing through $B_3$, and according to the month we use, so will we limit the days to the number of days of said month, as appears in the designations just below row 8 of $A_1$.

Use of the perpetual calendar

First we take movable field B and seek, in Table $B_1$, in columns $a$, $c$, $e$ or $f$, the first or first two digits of the year; one digit for years 100 to 999, the first two for years 1000 and later; for years 1–99, the "0" is used. Take note now that slide $B_2$ has space $a$–1 in blank, or preferably designated with a star or other similar device; move slide $B_2$ so that this star is immediately below the century column chosen in $B_1$. However, should the century digits appear in column $f$, which correspond to the "leap-year centuries" i.e. those starting with 800, 1200, 1600, 2000 and so on, we can use this arrangement only for Jan. and Feb.; for Mar.–Dec. we must make the coincidence of the star with column $g$, that is to say, the next column to the right, which is wholly blank. This is due to the fact that these special centuries have an extra leap year to begin with, hence the exception.

Now, taking care that slide $B_2$ is not displaced from the position in which it was set according to the preceding paragraph, place movable field B over fixed field A, their upper edges coinciding, and make that column of $B_2$ that contains the tens and units digits of the chosen year coincide with that column of $A_2$ that contains the number of the month (in arabic numerals). Thereupon within the cut-out $B_3$ of B, there appears the correct calendar month for that month and year.

As an example, to find the month of August, 1962, Table $B_2$ is set relative to Table $B_1$ with starred space $a$–1 of $B_2$ in vertical alignment with column $a$ of $B_1$ containing the number 19. Then, keeping $B_2$ in this relationship, entire slide B comprising $B_1$, $B_2$ and $B_3$ is slid laterally until column $a$ of $B_2$, containing the number 62, is in vertical alignment with column $b$ of $A_2$, containing the number 8 for August. Thereupon, in cut-out $B_3$ will appear the calendar for August, 1962, the first day of which is Wednesday.

It is, of course, necessary to vary the procedure slightly when we are dealing with ordinary leap years; these are indicated in Table $B_2$ on the slide, in two adjoining columns; one of these columns corresponds to the numerals 4, 8, 12 and other multiples of 4, followed by a dash in the column adjoining it to the right. In these cases, use the column indicated by the numeral corresponding to the place of the year within the century, when you are looking for a date in Jan. or Feb.; for the other months, Mar. to Dec. inclusive, use the column indicated by the dash to the right of the multiple of 4.

Likewise, when dealing with years that end a century, like 1700, 1800, 1900, 2000, etc., the proper coincidence of movable slide $B_2$ with fixed Table $B_1$ is obtained by placing the column containing the star—which is really the 0 of the century—in coincidence with the proper column in $B_1$. If the "00" had been used instead, we would be dealing with one century ahead, i.e. if we had chosen 7 for the century and 00 for the year, we would have a date in the year 700 plus 100=800!

Finally, a word as to the use of years B.C. for establishing in that era a calendar for a given month, as if the Gregorian Calendar had been in force. The centuries B.C. are designated with a minus sign that precedes the number of the century. However, care must be taken to use these centuries as follows and we had better show this by an example. Suppose we want to find a date in the year 45 B.C. Evidently, this is the first century B.C., i.e. Century −1; but the first year of the century was −100 and 45 B.C. corresponds to 55 years after the beginning of the century. This gives us our rule: Subtract the tens and units figure of the year B.C. from 100, and consider this as the number to be chosen on slide $B_2$; the century shall be one digit of the minus type, of greater absolute value of one than the century chosen. For instance, if the year desired is 273 B.C., choose in $B_1$ the digit −3 and, in $B_2$, 100−73=27.

In FIGURE 4 we have depicted a view of an actual example of the use of the calendar for finding the month of June 1898; here the star of slide $B_2$ has been moved in order for it to be placed beneath column $c$ of $B_1$, where the digits "18" appear, corresponding to the "century" digits of 1898; then, the movable field B has been displaced in such a fashion, that while the upper edge of B coincides with the upper edge of fixed field A, the year number within the century, "98" comes to be located vertically over the month digit (6 for June in this case) with field $A_2$. Immediately in window $B_3$ appears the calendar month for June 1898, which commenced on Wednesday the 1st and ended on Thursday the 30th, the "31" must be disregarded, as June has only thirty days. The chosen numbers have been emphasized by arrows.

It will be evident to those versed in the art that the particular calendar described and depicted as forming the base of the present invention is to be considered as a particular embodiment as applied to the computation of the Gregorian Calendar. However, following the ideas hereinbefore set forth, it is a simple matter to so change the numbers in the divers fields or tables depicted that a perpetual calendar may be constructed for other computations as, e.g., the Julian Calendar, dating from 45 B.C. Such a transformation, as well as others, are to be considered as coming within the scope of the invention.

Again, the constructional details of this calendar are not limited; the movable field B, for instance, has been depicted as a sheet, the upper edge of which is to coincide with the upper edge of A. However, should B be prolonged higher up than the line of coincidence by a folded flap, which would "hook itself" onto the upper edge of A, such constructional detail shall not be construed to be outside the scope of the invention. Then again, sheet B could be prolonged by a lower panel, of narrow width, from the left edge as far as about letter K in FIG. 4, so that the window $B_3$ would be closed along its bottom side. These and other such details which may be apparent to those versed in the art are also to be considered as within the scope of the invention.

Finally, Table $B_1$ may be prolonged vertically up or down, at will, to include other desired centuries, following the difference of 4 between vertically placed digits. Or else, recourse may be had to the fact that the calendar repeats itself exactly every 400 years. Therefore, if we are looking for a date, the year of which is not included in our tables in columns $a$, $c$, $e$ or $f$, it is only necessary to subtract therefrom (or add thereto, as the case may be) some multiple of 400 years, and work with the result. For example, the 8th of January 7856 would have the same week day as the 8th of Jan. 1856; this is found by subtracting from 7856 the figure 6000, which is a multiple of 400, i.e., 15×400. This will not alter the week day nor the calendar month of that so far distant date in the future, as computed by the present Gregorian Calendar.

If a rearrangement is desired in the order of week days, so that the week should begin with Sunday, Table $A_1$ must be displaced towards the left by the width of a base column, so that Column $a$ will begin at the 5th row with the proper digits (6, 13, 20 and 27 in FIG. 1) and Column $x$ begins at the 1st row with digit 1, as it is also shown in FIG. 1. An empty column will appear then between Tables $A_1$ and $A_2$. Also the cut-out portion $B_3$ should be displaced towards the left by the width of a base column, FIG. 2, so that the distance MK will correspond now to 7 (seven) basic units, instead of 6 as explained above.

It wil be apparent to those skilled in the art that various changes may be made in the invention, without departing from the spirit and scope thereof, and therefore the invention is not limited by that which is shown in the drawings and described in the specification, but only as indicated in the appended claim.

I claim:

A device for use as a perpetual calendar which comprises, in combination, the following parts:
- a fixed field which has depicted thereon
  - a first table containing divers combinations of the number of days in a month of 31 days, as well as indications of the days in each respective month, and
  - a second table on said fixed field with the indication of the month and also indicated by their ordinal numbers,
- a second field separate from the first field and movable thereupon relative thereto, which contains
  - a fixed table containing the first or first two digits of the years, in other words, the century designation of the years and, below the same,
  - a slide horizontally movable relative to the fixed table with the indication of the third and fourth digits of the years and leap-years; and likewise
  - a cut-out window horizontally movable relative to the first table of the fixed field; the tables and slide having indicia thereon cooperating to set the window for use for a certain month in a certain year and the window having thereon indicia cooperating with indicia on the first table on the fixed field to show the days of the week of said month.

References Cited by the Examiner
UNITED STATES PATENTS

| | | | |
|---|---|---|---|
| 2,668,382 | 2/54 | Spencer | 40—109 |
| 2,684,545 | 7/54 | Talbot | 40—109 |
| 2,768,459 | 10/56 | Corbett | 40—109 |
| 3,017,711 | 1/62 | Boggis | 40—109 |

JEROME SCHNALL, *Primary Examiner.*

E. V. BENHAM, *Examiner.*